United States Patent
Geis et al.

[11] 3,917,414
[45] Nov. 4, 1975

[54] OPTICAL INSPECTION SYSTEM

[75] Inventors: James D. Geis, Cheshire; Henry R. Cofek, Fairfield, both of Conn.

[73] Assignee: Geisco Associates, Cheshire, Conn.

[22] Filed: Oct. 11, 1973

[21] Appl. No.: 405,449

[52] U.S. Cl. ................ 356/200; 350/6; 350/190; 356/237
[51] Int. Cl.² ..................................... G01N 21/32
[58] Field of Search .......... 356/160, 199, 200, 209, 356/237; 250/559, 562, 563, 572, 235, 570, 227, 571; 350/6, 190

[56] References Cited
UNITED STATES PATENTS

| | | | |
|---|---|---|---|
| 2,692,369 | 10/1954 | Geiser | 350/6 X |
| 2,883,649 | 4/1959 | King | 250/227 X |
| 3,060,319 | 10/1962 | Greunke | 250/571 |
| 3,436,757 | 4/1969 | Schwab | 250/227 X |
| 3,618,063 | 11/1971 | Johnson | 250/563 X |
| 3,659,950 | 5/1972 | Troll et al. | 356/200 X |
| 3,694,658 | 9/1972 | Watson et al. | 356/199 X |
| 3,746,840 | 7/1973 | Ogland et al. | 250/570 X |
| 3,804,534 | 4/1974 | Clarke | 356/209 X |

*Primary Examiner*—Ronald L. Wibert
*Assistant Examiner*—Matthew W. Koren
*Attorney, Agent, or Firm*—DeLio and Montgomery

[57] ABSTRACT

A method and apparatus for optically inspecting the surface of sheet or web material wherein moving material is scanned transverse to its direction of movement by a spot of light and reflected light is analyzed to determine any surface defects. The transverse position of the scanning spot is continuously monitored to indicate the location of any detected defects.

26 Claims, 23 Drawing Figures

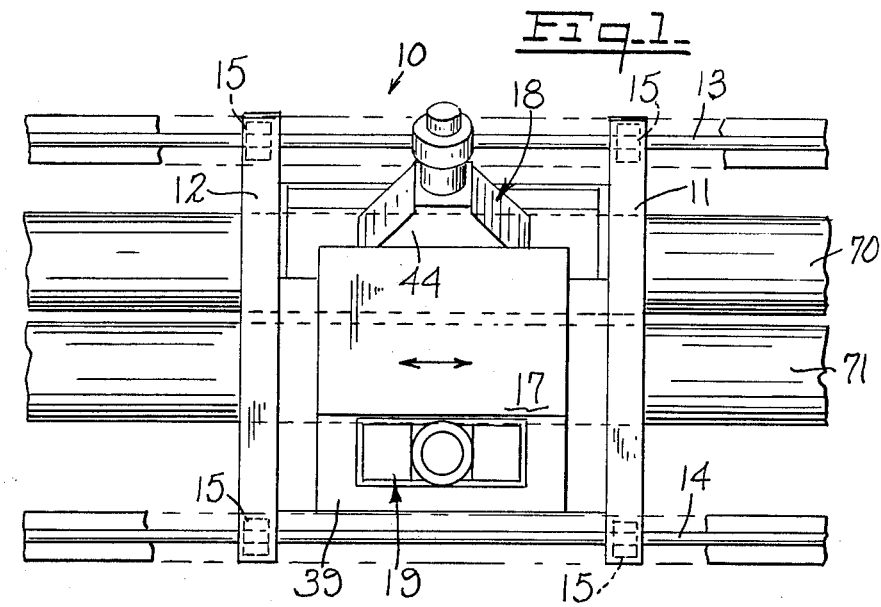
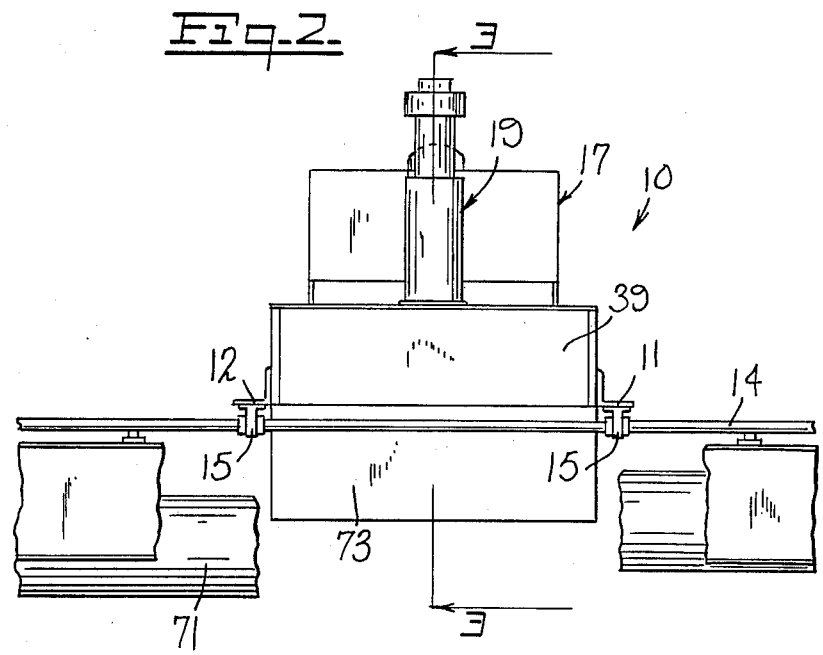

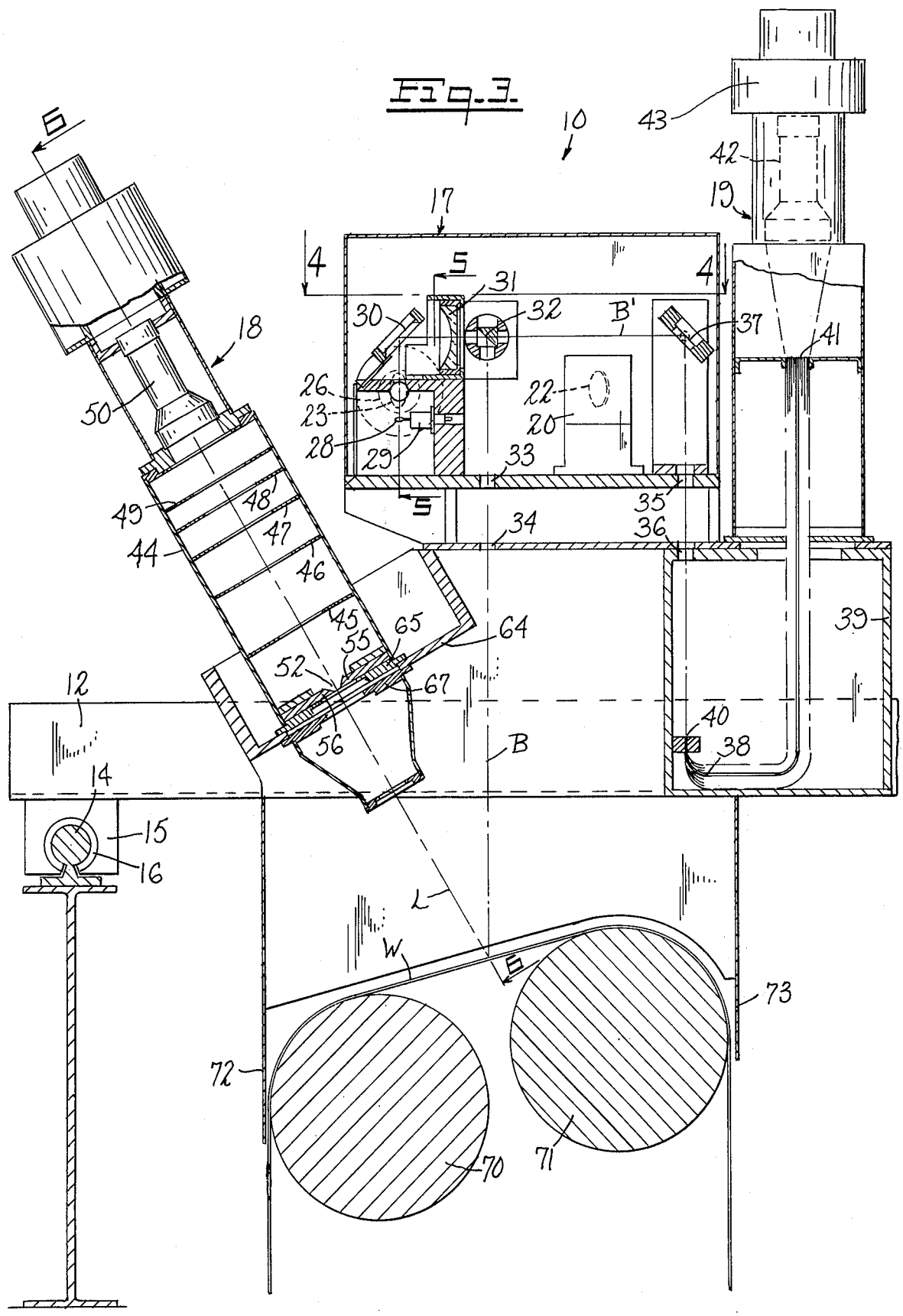

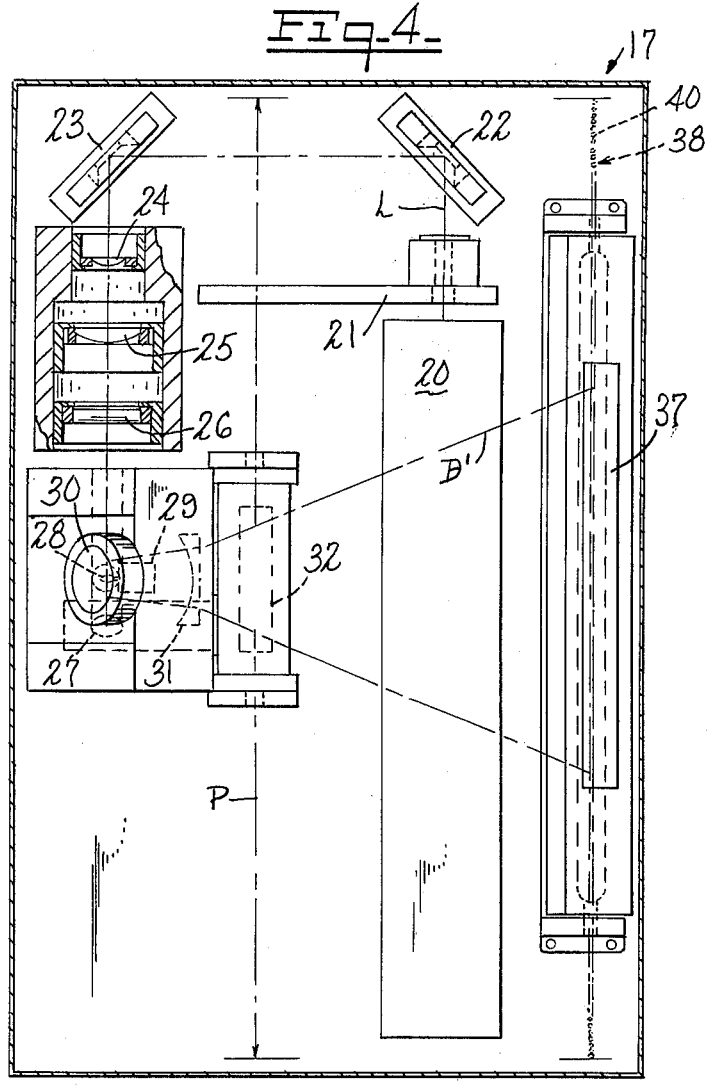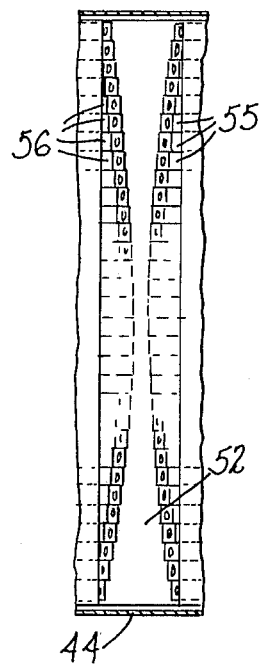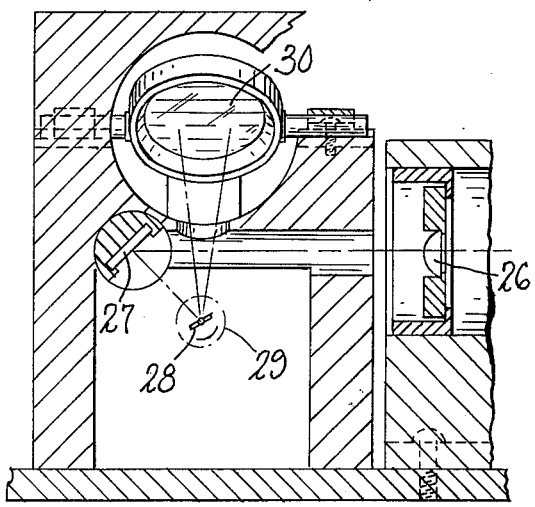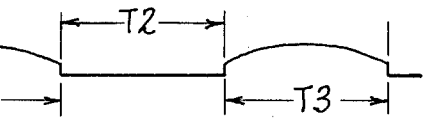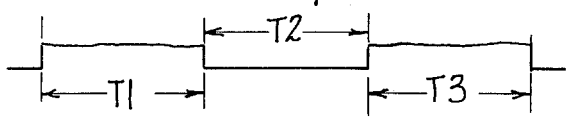

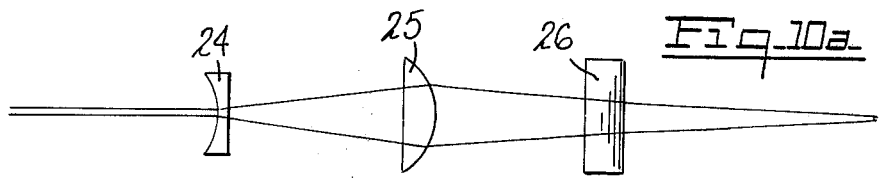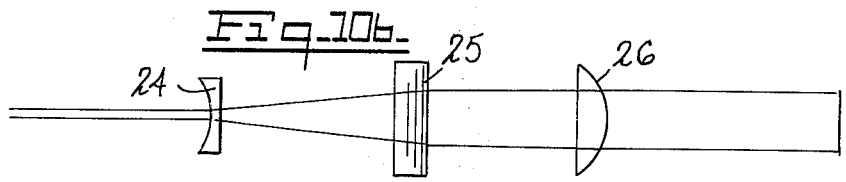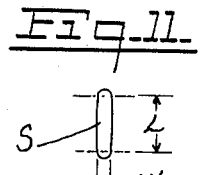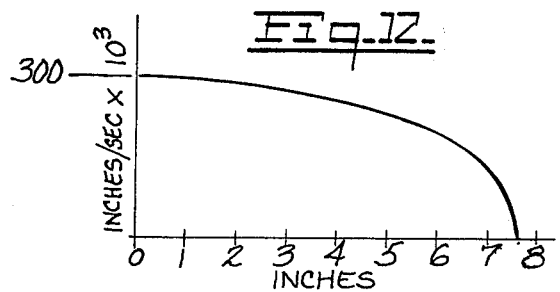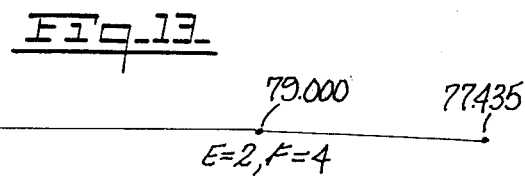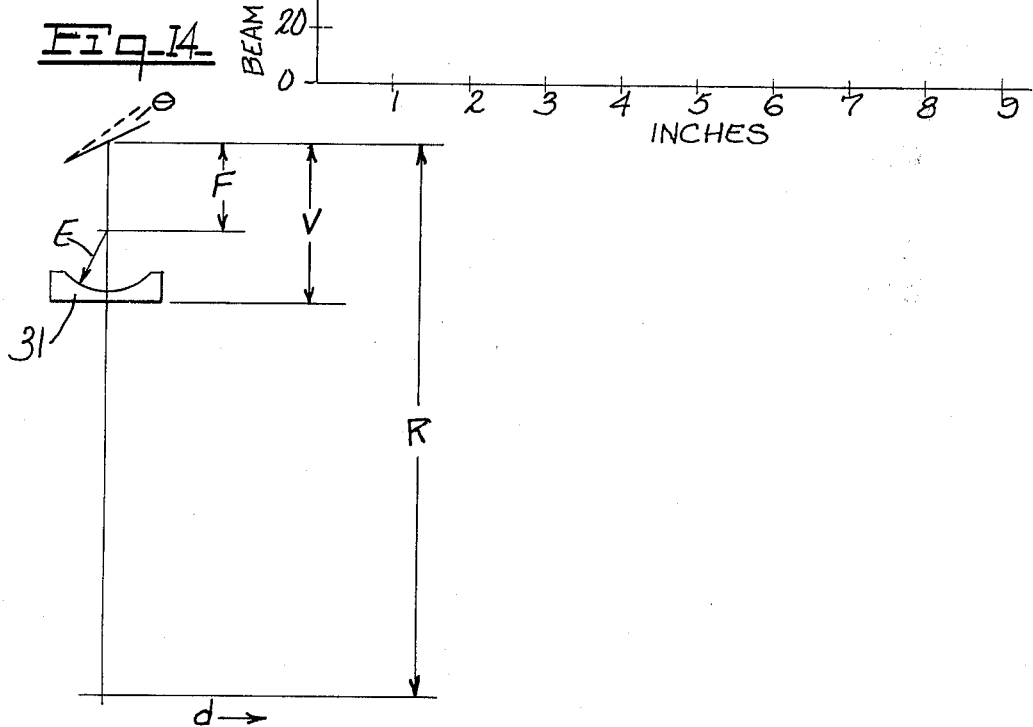

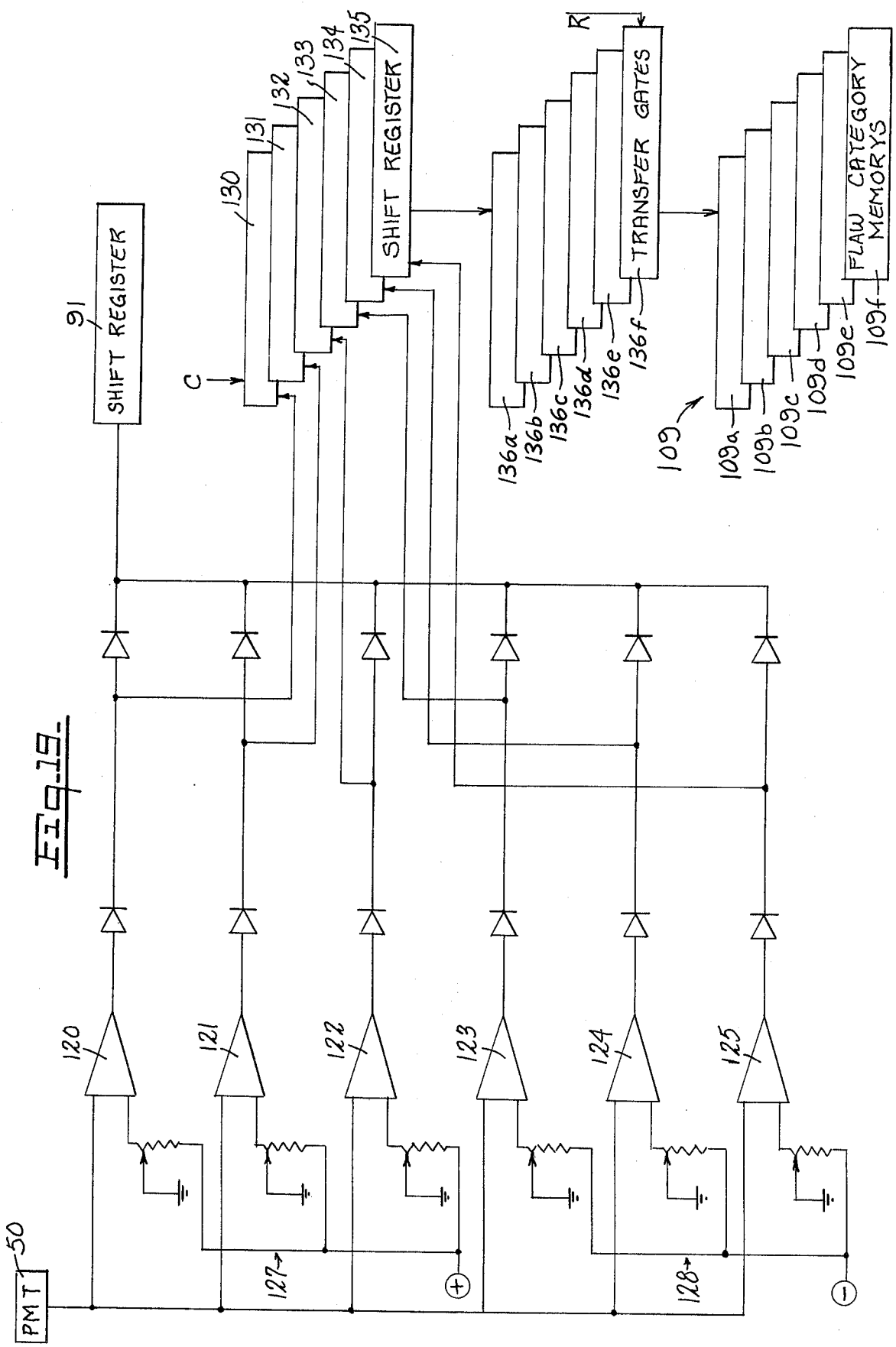

OPTICAL INSPECTION SYSTEM

This invention relates to optical systems, and more particularly relates to a method and system for scanning the surface of sheet or web material and detecting defects or discontinuities in the surface, and the location thereof.

Optical inspection systems are known which detect surfaces defects of a moving sheet or web material. Generally in such systems a beam of light is utilized to scan transversely of the direction of movement of the web and a photodetector is positioned to be responsive to light changes caused by varying characteristics of the material which may be caused by discontinuities or defects in the surface and generating a pulse signal in response thereto. Existing systems of this type have no efficient means for determining the exact location of a defect or discontinuity nor the size or nature thereof and generally only tell the existence of a defect, and perhaps the longitudinal location thereof on the sheet.

Existing systems of the type described may utilize a rotating-mirror or acousto-optical light beam deflection devices to cause a light beam to scan the surface of a web. These devices generally require a high scanning frequency and are relatively expensive as compared to the use of an oscillating galvanometer mirror.

The present invention provides a new and improved method of detecting not only the existence of surface flaws or discontinuities but the location and sizes thereof while disregarding noise inherent in such systems. The present invention includes improvements for optimizing such a system by maintaining the velocity of the scanning beam spot on the web essentially constant and in focus on the web as it scans a width of the web.

The invention further provides shaping of the inspection beam so that the scanning spot is elongated in the direction of travel of the material to thereby insure that the entire surface of the material is inspected without unduly decreasing the speed of the material, and to permit lower scanning frequencies and the use of a less expensive scanning device.

Briefly stated, the invention in one form therof includes a means for moving the material across an inspection area while a concentrated beam of light is moved so as to scan tranversely of the direction of movement of the material. A photodetector in the form of a photomultiplier tube is arranged to detect the light reflected from the material and any changes therein. The scanning beam of light is reflected towards the material by a mirror which moves with simple harmonic motion. A velocity compensating lens is disposed in the optical system so that the velocity of the scannng spot as it moves across the material is essentially linear with respect to the material and in focus on the web across the width thereof. The scanning spot is also monitored by a plurality of light modifying or light receptive devices and a second detector so that the output of the second photodetector will indicate the instantaneous incremental position of the scanning spot across the width of the material. A change in the light reflective characteristic of the material is correlated with the instantaneous incremental position of the scanning spot and also the dimension along the length of the material. Subsequent scans are also detected and may be stored. By noting the pattern of discontinuities with respect to location, the size of all defects may also be determined. If desired, a complete record of the material may be made and then utilized in later cutting of the mateial to predetermined lengths so as to avoid and work around the defects.

An object of this invention is to provide a new and improved method of optically inspecting material.

Another object of this invention is to provide a new and improved method and system for optically inspecting the surface of a material in which new and improved means are provided to determine the location and size of a surface defect.

A further object of this invention is to provide an optical inspection system of the type described in which new and improved means are provided for moving the scanning spot at a linear velocity across the material being inspected with the beam in focus on the material.

A further object of this invention is to provide a new and improved optical system for shaping the scanning spot.

The features of the invention which are believed to be novel are particularly pointed out and distinctly claimed in the concluding portion of this specification. However, the invention both as to its operation and organization and method of practice thereof, together with further objects and advantages thereof, may best be appreciated by reference to the following detailed description taken in conjunction with the drawings, wherein:

FIG. 1 is a plan view of an apparatus embodying the invention;

FIG. 2 is an elevation of the apparatus of FIG. 1;

FIG. 3 is a view seen in the plane of lines 3—3 of FIG. 2;

FIG. 4 is a view seen in the plane of lines 4—4 of FIG. 3;

FIG. 5 is a view seen in the plane of lines 5—5 of FIG. 3;

FIG. 8 is a view seen in the plane of lines 8—8 of FIG. 7;

FIGS. 9a and 9b are diagrams of representative waveforms of the output of the discontinuity detector without and with a spatial filter;

FIGS. 10a and 10b are diametric illustrations of a portion of the optical system which provides an essentially rectangular scanning beam.

FIG. 11 is a representation of an essentially rectangular scanning beam produced by the optics of FIGS. 10a and 10b;

FIG. 12 is a velocity profile of the beam spot of a web of material to be inspected without compensation;

FIG. 13 is a velocity profile of the beam spot across the web with compensation;

FIG. 14 is a diagrammatic view of a portion of the optical system embodying the invention using a velocity compensating lens;

FIG. 19 is a schematic diagram in block form of the flaw pulse height detection and storage network;

Figure 6:
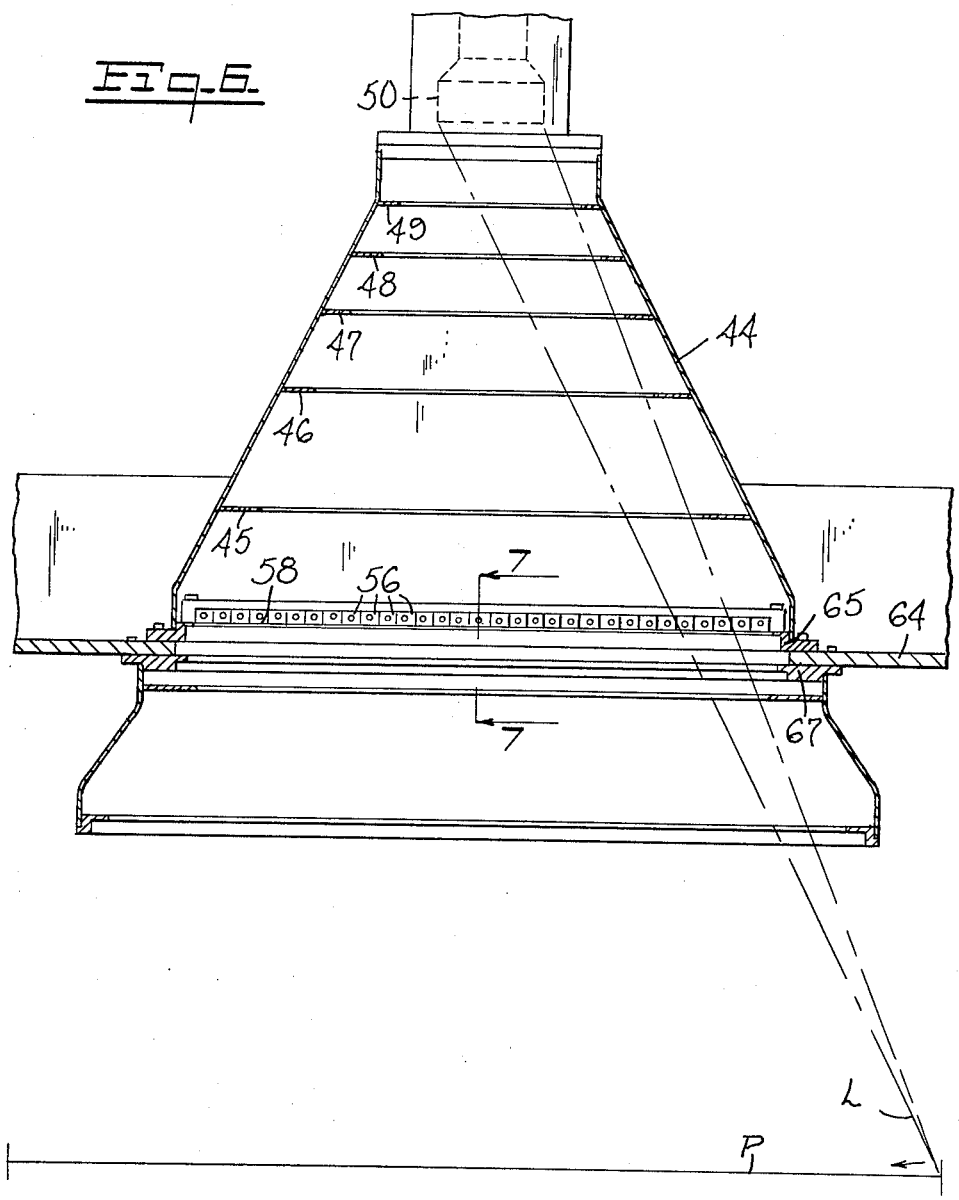
FIG. 6 is a view seen in the plane of lines 6—6 of FIG. 3.
Figure 7:
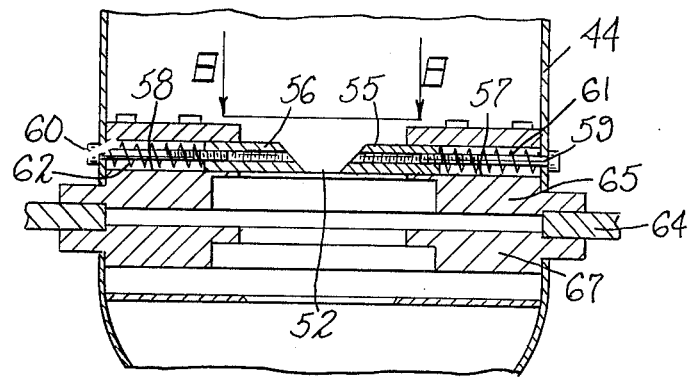
FIG. 7 is a view seen in the plane of lines 7—7 of FIG. 6.

FIGS. 1–8 exemplify an overall assembly 10 embodying the invention which includes support arms 11 and 12 movable linearly on guide rails 13 and 14 along the width of a web W of material to be inspected. Depending from arms 11 and 12 at each end thereof are members 15 (FIG. 3) including bushing 16 therein which move on the guide rails. The assembly 10 includes a housing member 17 for the optical system, a reflected light detector housing 18 and a housing 19 for a lateral position monitor.

A source 20 (FIG. 4) of a concentrated light beam, which may be a helium neon laser, directs a highly concentrated beam of light L through a mask 21 and a collimator where required, at a first mirror 22 where it is reflected to a second mirror 23. The beam L is then passed through a diverging lens 24 to a first cylindrical lens 25 and a second cylindrical lens 26. The cylindrical lenses shape the beam as hereinafter explained. The beam passing through lens 26 is reflected from a mirror 27 (FIG. 5) to an oscillating galvanometer mirror 28 which is motor driven and moves or oscillates with simple harmonic motion. A suitable galvanometer is one designated G115 available from General Scanning, Inc. of Watertown, Mass. which includes a motor 29 and driving amplifier (not shown). The beam of light as reflected from galvanometer mirror 28 is directed to an overhung mirror 30 and, hence, reflected through lens 31 to a beam splitter 32. Beam splitter 32 will split the light beam L and provide a primary inspection beam B and an auxiliary or second beam B'.

The beam B, as shown in FIG. 3, is directed in a plane towards the material to be inspected through elongated slots 33 and 34 in housing 17 and will repetitively scan across the material. As a feature of the invention, an additional lens 31 is interposed between mirror 30 and beam splitter 32. The lens 31 is arranged through its design and selection of its placement to make the speed of the beam spot as it scans across the material essentially constant, or otherwise stated, have a linear velocity profile across the material web.

The housing 17 is light tight except for the slots 33 and 34 which pass the primary beam B and also apertures 35 and 36 to permit passage of the beam B'. The beam B' is incident on a mirror 37 and moves with the same lateral and angular velocity as beam B.

A multiplicity of flexible fiber optic rods 38 are disposed in housing 39 with the ends 40 thereof linearly aligned in predetermined spacing and arranged to receive light energy of the beam B' as it sweeps across mirror 37 and is reflected downwardly through apertures 35 and 36. The optical fiber rods are than carried in a bundle so that the ends 41 thereof will repetitively present the pulses of light energy from beam B' to a detector in the form of a photomultiplier tube 42 disposed in a housing 43.

This arrangement provides a means for continuously monitoring the lateral position of the primary beam B as it moves across a piece to be inspected by monitoring the position of the auxiliary beam B'. The ends 41 of the fiber optic rods which may number as many as 500 will thus always correspond to a discrete location in an X-axis of a coordinate system where the Y-axis is the direction of movement of the sheet or web material. As the beam B' sweeps across mirror 37 and is reflected downwardly, it will move across the aligned ends 40 of the fiber optical rods 38 and each incremental movement along the aligned ends 40 is a count of the spacing increment therebetween. This count is converted to a pulse train by detector 42, as hereinafter explained.

This same function could be achieved through use of a grating in which light from beam B' is transmitted through uniformly spaced openings along the length of the grating and would appear as pulses of light on the other side of the grating.

The reflected light detector is carried in housing 18 and mounted so that the longitudinal axis of the photodetector coincides with the path P of incidence (FIG. 6) of the beam B on the web W.

The detector 18 is best shown in FIGS. 3 and 6–8 and comprises a first housing member 44 having a plurality of baffles 45–49 positioned therein to define the light-receiving passage of the detector and eliminate random light from reaching the detector. A photodetector in the form of a photomultiplier tube 50 is positioned above the openings defined by the baffles.

The detector has an elongated slot-like opening 52 defined at the bottom thereof, and is provided with an adjustable spatial filter. This adjustable spatial filter is the subject of application Ser. No. 405,448, now U.S. Pat. No. 3,849,004 filed on the same date as this application. The filter defines a spactial opening 52 as most clearly seen in FIG. 8. The filter is comprised of a plurality of adjustably positionable elements 55 and 56 on either side thereof. The elements 55 and 56 are positionable on surfaces 57 and 58, respectively, as by means of bolts 59 and 60, respectively, threadably received therein to provide any desired shape of the opening 52. Disposed between the elements 55 and 56 and the respective bolts are biasing springs 61 and 62, respectively, to maintain a set position.

The purpose of the elements 55 and 56 is to define the opening 52 to compensate for the change in the magnitude of the light reflected toward photomultiplier 50 as the scanning spot moves off the center of the web W. The reflected light at the lateral center of the web W will be right on the axis of photomultiplier tube 50. As the beam B moves from and toward the edges of the web W the reflected light of off-axis, and the energy level of the reflected light as normally seen by the photomultiplier will be a minimum at the edges. Therefore, the opening 52 may be defined with a lesser dimension at its center than at its edges as a function of the width of the web W, and characteristics of the material.

The housing 18 is mounted in fixed relation to housing 17 through member 64 and an upper adaptor 65 which provides the surfaces 57 and 58. The lower portion of housing 17 is mounted to member 64 through a lower adaptor member 67.

With the arrangement thus far described a very highly concentrated beam of light L is shaped to have a given spot configuration and sweep laterally across web W which is presented to the beam B in a smooth plane on platform rolls 70 and 71. The web W as it moves over the rolls may be contained in a hood or shroud defined by depending baffles 72 and 73. As the beam B moves across the web W the beam B' moves at the same velocity and distance across the ends 41 of fiber optic rods 38 and thus constantly monitors the position of beam B.

Reflected light from discontinuities in the surface of the material produces a change in the level of output of photomultiplier tube 50. The lateral position on the material at which time such output is varied is monitored, as hereinafter described, to provide an indication of the location of such defect.

The provision of the two lenses having surfaces defined on a cylinder, lenses 25 and 26, changes the cross-sectional outline of the source beam from a circle to an elongated generally rectangular beam and resultant scanning spot. The lenses 25 and 26 are arranged so that the major dimension of the beam is in the direction of travel of the web W. The elongated beam spot provides several advantages. If an elongated defect is detected in the beam there will be a larger pulse output from photmutiplier 50. Thus the generally rectangular shape of the beam enhances development of the information desired. The longer beam also enhances the scanning of the movable material in that in any given scan it covers more area, and allows the frequency of scan to be low. The beam may be shaped to optimize the operation of the system in view of various parameters including the type of material of web W. The elongated beam spot may also be angled to the direction of travel of the web if so desired. This may be accomplished by changing the angular relationship of lenses 25 and 26.

FIG. 9a exemplifies the waveform derived from photomultiplier 50 without the variable spatial filter and without detection of any surface discontinuities. The detected magnitude of the detected specular reflection decreases away from the central axis of detector 50. To obtain a linear output from photomultiplier 50, the elements 55 and 56 are positioned as shown in FIG. 8 to define the opening 52. The lesser dimension at the center of the opening admits less light, and the increasing dimension towards the edges would admit more light. This will modify the output of the photomultiplier to the waveform shown in FIG. 9b, where there is an essentially linear base level during each scan. The noise appearing on the waveform is from the laser and the system electronics. FIG. 9b further exemplifies a cycle of operation of scan and retrace. After a scan time of T1, the beam B is retraced during the time T2 for another scan during time T3. During the time T2, the defect information derived during scan time, if any, is stored and processed. The photomultiplier will provide an output during retrace time T2, but this is ignored, as hereinafter explained.

FIGS. 10a and 10b exemplify the spot S of beam B with the provision of the cylindrical lens elements 25 and 26. FIGS. 10a and 10b are diagrammatic views of the lens elements 24, 25 and 26 seen in mutually perpendicular planes. The effect of the two cylindrical lens elements 25 and 26 is to decrease the dimension of the beam spot S, as shown in FIG. 11, in one direction and to elongate the beam spot in the other. The elongated dimension is in the direction of travel of the web W. This shape of the spot S enhances the development of the information sought, besides permitting a slower scan rate.

The advantages of the shaping of beam B will be apparent if one assumes a web speed of 500 feet per minute with a 0.020 inch diameter beam, and a scan overlap of 20 percent. With these parameters the required scan frequency Fs would be $$F_s = \frac{\frac{500^{ft}/_{min} \times 12^{in}/_{ft}}{60^{sec}/_{min}}}{.02 \text{ in} \times (1-.2)} = 6250 \text{ cycles}/_{sec}$$

To obtain this scanning frequency an expensive multiface rotating mirror is required. If, however, the beam is shaped to produce a 0.02 × 0.125 inch scanning spot S the scanning frequency is $$F_s = \frac{\frac{500 \times 12}{60}}{.125(1-.2)} = 1000 \text{ cycles}/_{sec}$$

The lower scanning frequency permits the use of an inexpensive galvanometer. Additionally, the lower scanning frequency lowers the bandwidth of the system electronics.

The galovanometer mirror is driven with simple harmonic motion, and therefore the velocity of the spot S moving across the material is not inherently linear. To provide a linear velocity of the spot S, lens 31 is provided having a shape and index of refraction which will convert the velocity of the spot to be essentially constant across the dimension of the material.

A typical plot of beam velocity at the web is shown in FIG. 12 for a 15 inch half scan, where the mirror is disposed 28 inches above the material and the mirror acts through an angle of 15° at a frequency of 781 cycles/-sec.

Such a profile exists due to the galvanometer coming to a stop at the end of each direction of movement. To effectively utilize the galvanometer without compensation, the angular movement must be made quite large and only the most linear portion thereof used. This would decrease the scan frequency substantially.

However, the same galvanometer may be utilized in accordance with the invention by placing a compensating lens 31 in the beam L to alter the velocity of the spot to an essentially linear profile as shown in FIG. 13.

FIG. 14 exemplifies a plano-concave lens 31 placed behind the galvanometer mirror, which will produce the velocity profile of FIG. 13 with a −80mm focal length lens 31, and values $E = 2$ inch; $F = 4$ inch; $R = 28$ inch; and $V = 4.375$ inch, where the index of refraction is 1.5.

The velocity $V_d$ of the beam spot on the lens is given by the equation:

$$V_d = [F'(\theta) + [V-G(\theta)]I'(\theta) + G'(\theta) I(\theta) + (R-V)H'(\theta)]d\theta/dt$$

where
$F(\theta) = (F \cos 2\theta + B) \sin 2\theta$
$G(\theta) = (F \cos 2\theta + B) \cos 2\theta$ $$I(\theta) = \frac{C \sin 2\theta}{C \cos 20 - (D-B) F}$$

$$H(\theta) = \frac{C \sin 2\theta}{J}$$

$$F'(\theta) = 2F\cos 4\theta + \frac{2\cos 2\theta}{B}(E^2 - 2F^2 \sin^2 2\theta)$$

$$G'(\theta) = 2F \sin 4\theta - \frac{2 \sin 2\theta}{B} (E^2 + F^2 \cos 4\theta)$$

$$I'(\theta) = \frac{2F^2 (D\text{-}B) [(D\text{-}B)J(\theta) + F \sin 2\theta] \sin 2\theta}{BD\ C \cos 2\theta - (D\text{-}B)\ F}$$

$$H'(\theta) = \frac{2E^4}{BDJ3} [BDC \cos 2\theta - F (D\text{-}R) (C\text{-}F^2) \sin^2 2\theta]$$

and
$B = \sqrt{E^2 - F^2 \sin^2 2\theta}$
$D = \sqrt{E^2 N^2 - F^2 \sin^2 2\theta}$
$J = \sqrt{E^4 - C^2 \sin^2 2\theta}$
$C = DB + F^2 \sin^2 2\theta + (D-B)\ F \cos 2\theta$ The angle θ is one-half the angular movement of the galvanometer mirror. The quantities R, V, F and E are shown in FIG. 14. The lens 31 is plano-concave, having a concave surface and thickness chosen in consideration of other dimensions to modify the angular velocity of the beam and provide an essentially linear velocity of the scan spots across the web. The upper surface of the mirror 31 may be concave defined as a partial surface of a cylinder inasmuch as the beam sweeps across the surface, always in the same path. This essentially linear scanning velocity will optimize the generated pulse width of flaws of a given size from center to edge as will hereinafter be made apparent.

The lens 31, while maintaining the velocity profile at the web essentially linear also increases the scanning angle by a factor Kθ since the index of refraction is greater than one. Additionally, the lens 31 serves to maintain the focus of the beam essentially uniform on the web, and thus has uniform light energy in the spot S from edge to edge.

A further advantage of the provision of the lens 31 is that it permits a non-symmetrical scan-process cycle. FIGS. 9a and 9b exemplifies three half cycles of mirror motion. The scan time may be selected as T1 dependent on the width of the web, while time T2 is used for processing any defect information derived during time T1.

With the foregoing equation, the parameters and location of the lens element 31 with respect to the web plane and galvanometer may be calculated empirically.

The linear velocity beam is directed at beam splitter 32. The shaped primary beam B is then directed toward the web W as shown in FIG. 3, and the beam B' is directed across the ends 40 of the plurality of optical fiber rods 38, which are positioned the same distance from beam splitter 32 as the scan line on web W. The rods are chosen in number for a desired resolution. The ends 40 are equally spaced and serve as a means for monitoring the position of the spot as it moves at linear velocity across the material. As the beam strikes each successive end 40, a light pulse is detected at the other end 41 by photomultiplier 42 and a pulse is emitted thereby. A count of the number of pulses transmitted by fiber rods 38 is correlated to the position of the spot on the material. Therefore, the time of detection of a surface discontinuity by photomultiplier 50 may be monitored by the fiber rods 38, and photomultiplier 42.

Inasmuch as the velocity of the scanning spot S across the material is constant, any surface defects or discontinuities may be readily located, with respect to temporal position, and correlated to dimensional position.

Figure 15:
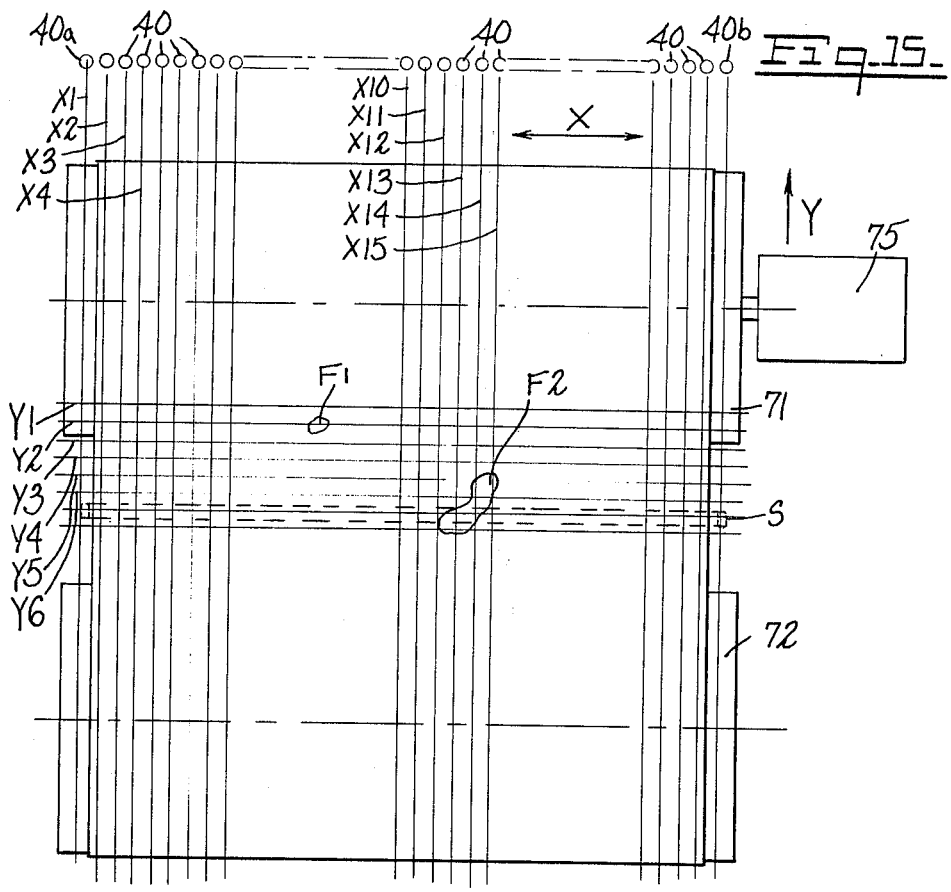
FIG. 15 is a view of web material to be inspected seen from above, together with a representation of the beam monitoring means.

FIG. 15 is a view of the web W as seen from above, and further representing the relation of the ends 40 of fiber rods 38 in relation to the width of the web W. A shaft encoder is shown coupled to platform roll 71, but it could also be attached to an idler roll in the plane of the beam B. Shaft encoder 75 is of the type which emits a pulse for each increment of rotation and, for example, might provide a pulse for every 0.001 inch of travel of the web. When these pulses are counted, as hereinafter described, the count at any given time is a measure of the length of web W that has been inspected.

The ends 40 of the fiber rods 38, which are equally spaced apart, define an X-axis across the length of the roll. The actual distance represented by the total length of the ends 40 may be greater than the width of the web. Additionally, in many cases, a dimension along the edges of the web may be ignored because they will eventually be cut and it is not worthwhile or desirable to check, say, the one-quarter inch along each edge of the web. In such a case the system may be arranged to ignore any defects in this edge area. The ends 40a and 40b are outside of the width of the web and provide start and stop signals as hereinafter described. The lateral positions of the ends 40 together with the pulse count from encoder 75 define a grid system on the web.

Exemplified on web W are defects or discontinuities F1 and F2, together with a lateral scan of spot S. The defect F1 will probably result in only one defect detection or count in one scan. However, the defect F2 will provide a plurality of laterally adjacent defect detections in successive scans. As will hereinafter be described, means are provided to identify such plurality of adjacent defect detections as a single continuous defect.

Figure 16:
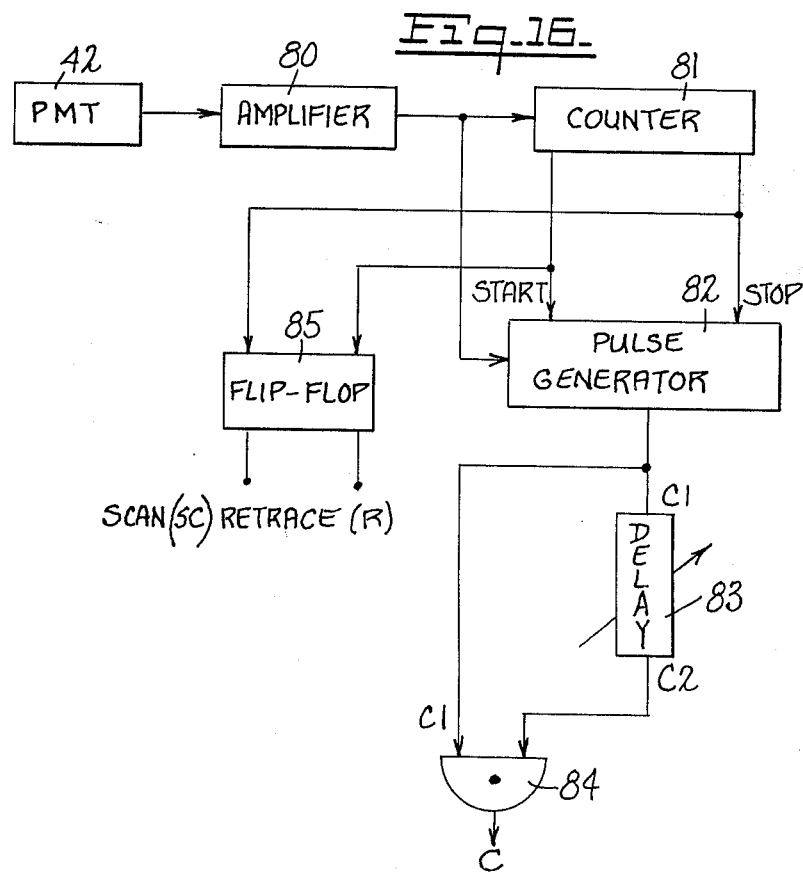
FIG. 16 is a schematic diagram, in block form, of a circuit for generating pulses indicative of beam position.

Reference is now made to FIG. 16 which exemplifies the processing network of the position pulses derived from photomultiplier tube 42. As beam B' sweeps along the ends 40 of the fiber rods 38, the other ends 41 of the fiber rods produce a discrete pulse of light energy to photomultiplier tube 42.

These pulse outputs of photomultiplier tube 50 are applied to an amplifier 80. The output of amplifier 80 is applied to a binary pulse counter 81. CCounter 81 is arranged to provide a start signal to a pulse generator 82 and further provides a stop signal to pulse generator 82 when the count therein reaches a second predetermined number. Pulse generator 82 merely acts to shape and pass a predetermined number of pulses from amplifier 80 between the time of the start and stop pulses.

The output C1 of pulse generator 82 is passed through a time delay which may be in the form of a delay line 83 having a variable setting. The delayed output C2 and the non-delayed output C1 are applied to an AND gate 84 and the output thereof is a train of pulses C which are used for clocking purposes and as an indication of beam position. The time magnitude of the delay provided by delay network 83 will predetermine edge width of the web W which may be ignored. For example, assume that on a time basis the output from pulse generator 82 was delayed three pulse counts with respect to C2. There would be no coincidence of pulses C1 and C2 for the first three pulses, and these may signify the initial edge width of the web which will be ignored.

The START and STOP signals from counter 81 may be used as a blanking and gating signal during retrace of the beam B. A flip-flop 85 may be set to one state at the start of a scan by the START signal and furnish a scan time signal SC. At the end of the scan, flip-flop 85 is reset by the STOP signal and provides a retrace time signal R.

From the foregoing it may be seen that during the inspection sweep of beam B a numerical count is made of the distance the beam B' moves and during this time a train of uniformly spaced pulses is generated in a number proportional to the width of the web W to be inspected.

Figure 17:
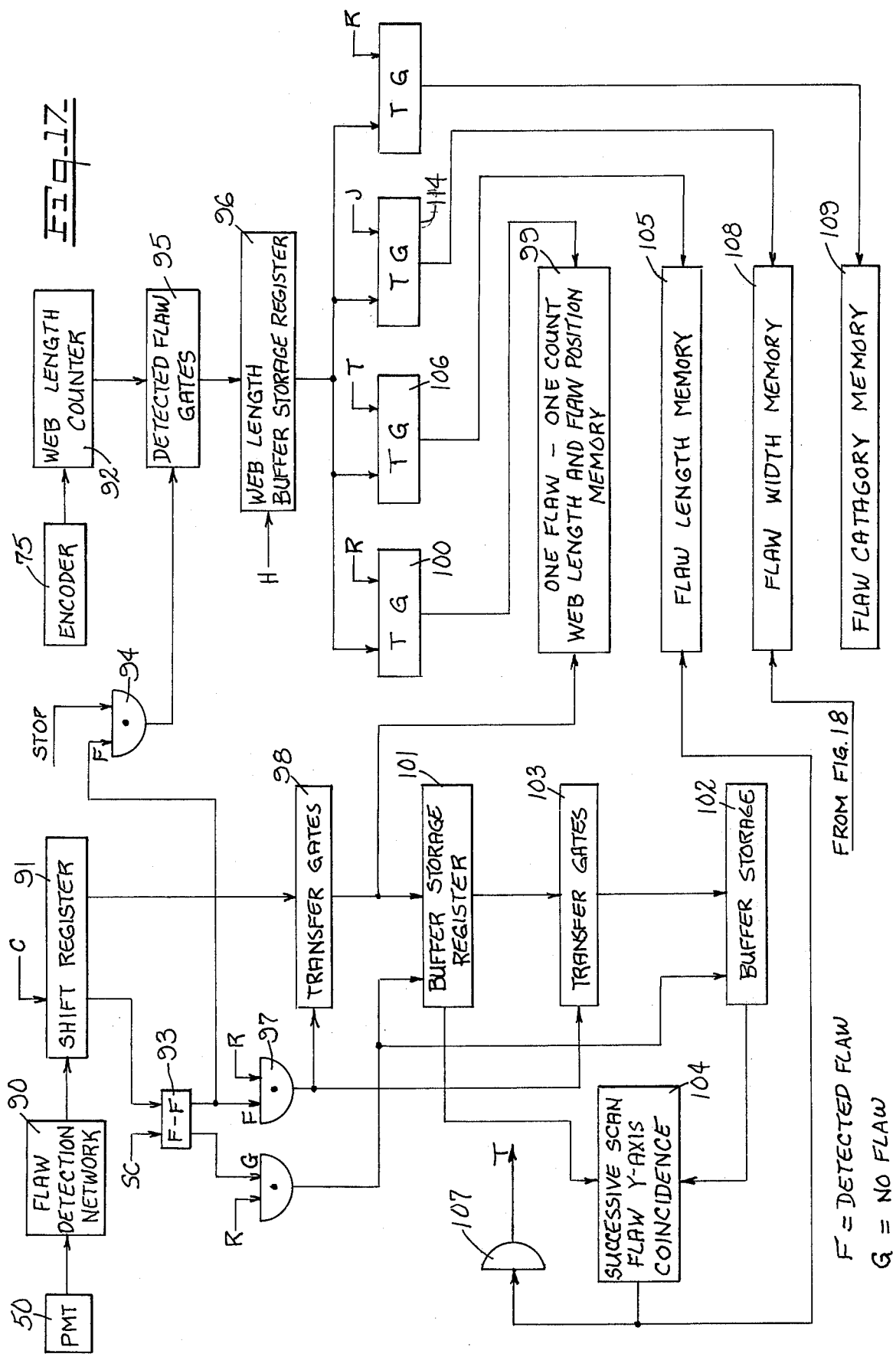
FIG. 17 is a schematic diagram, in block form, of a network for processing and storing detected flaw information.

Reference is now made to FIG. 17 which exemplifies a network for processing the signals representative of detected discontinuities in the web W. The output of photomultiplier tube 50 is applied to a detection network 90 which will detect signal levels on the output of photomultiplier tube 50 indicative of defects or discontinuities in the surface of web W, and convert such signal levels to pulses. A logic one level pulse is indicative of a detected defect, while a logic zero level indicates no defect detection. Such pulses, if any, are applied to a shift register 91, in clock time with web position pulses C from pulse generator 82 and gate 84. Then at the end of any scan signified by the STOP signal from counter 81 and/or retrace time signal R the binary level content of shift register 91 will indicate the lateral position of any defect or discontinuity during that scan of beam B. Simultaneously, encoder 75 is applying pulses indicative of web length measurement to a web length counter 92 so that at the end of any scan the content of shift register 91 and the length measurement in counter 92 will coordinately indicate and locate any detected discontinuity. This information, as will be hereinafter explained is then applied to a memory which may be a portion of a computer. The data developed during any scan of the beam B is then processed during the retrace or the time T2, as exemplified in FIGS. 9a and 9b. In the majority of cases, it will only be desirable to memorize or remember the longitudinal location of detected defects. For this purpose the input to shift register 91 is scanned to determine if a discontinuity has been detected each scan. A flip-flop 93 is set by any flaw level pulse entering shift register 91, and reset at the start scan signal SC from flip-flop 85. When a flaw pulse, which may be a binary one level, sets flip-flop 93, it provides a signal F. At the end of a scan at the STOP count from counter 81, a coincidence gate 94 applies a gating signal (if F occurs) to momentarily open detected flaw gates 95 and transfer the count of web length into web length buffer storage register 96.

The various gates, shift registers, storage registers, and memories may take many different conventional forms. For example, the storage registers and memories may either be a plurality of bi-stable electronic circuits or magnetic core arrays. The transfer gates are circuits which copy the binary level content of one register or counter into another register. Various components including integrated circuit chips which perform the functions herein described are readily available and well known to those skilled in the art. Circuits embodying such functions are also fully described in "Digital Computer Principles" of Burroughs Corporation, published by McGraw-Hill Book Company, Inc. 1962.

At the end of a scan, which includes a detected flaw, a gate 97 responsive to signals F and R opens transfer gates 98 which transfer the data in shift register 91 into web length and flaw position memory 99. At the same time, the web length count is transferred from buffer register 96 through transfer gates (TG) 100.

The flaw position data is also transferred to a buffer storage register 101, and any flaw position data in register 101 from the previous scan is transferred to buffer storage register 102 through transfer gates 103. The data indicative of successive scans is compared by coincidence gates 104, and coincidence in successive identical scan positions is recorded in a flaw length memory 105, together with web length count through transfer gates 106. An OR gate 107 supplies a signal T to transfer gates 106, if any coincidence is detected, to open transfer gates 106 and record the web length in memory 105.

It will be appreciated that additional transfer gates and buffer storage registers such as 101 and 102 may be provided to search for flaws of other than two Y coordinate increments. However, if there is a flaw of four Y coordinate increments then there will be three successive outputs from successive scan comparator 104 and such information will be read into flaw length memory 105.

Figure 18:
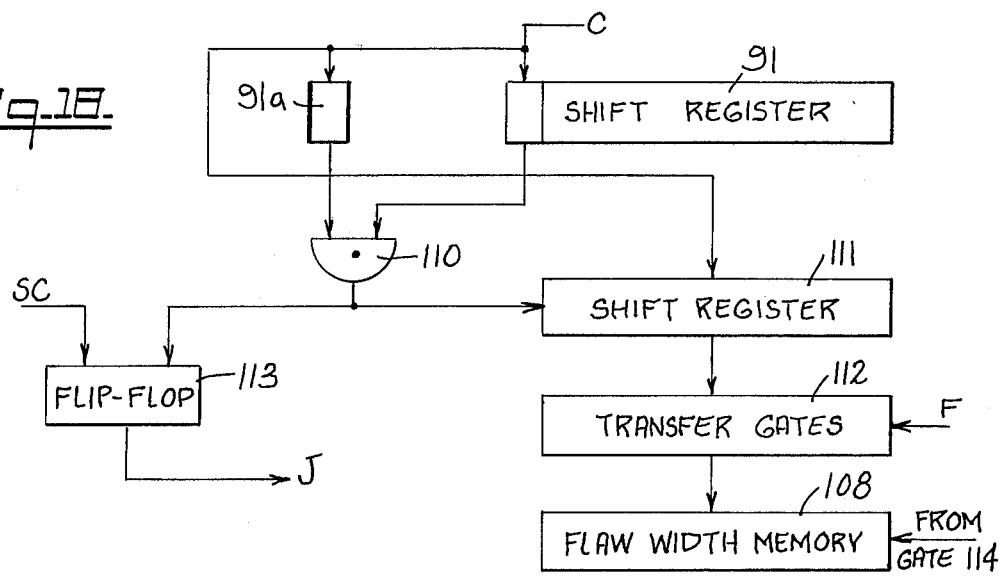
FIG. 18 is a schematic diagram, in block form, of a network for detecting adjafent or continuous flaws in one scan.

The system further includes a flaw width memory 108 and a flaw category memory 109 whose function is further described in conjunction with FIGS. 18 and 19.

Flaw width intelligence may be derived as shown in FIG. 18. Whenever two pulses are successively shifted into register 91 in one scan, this is indicative of a flaw or discontinuity of greater than one incremental unit in the X-axis, and this may be recorded for memory. The shift register 91 may be provided with a dummy first position or stage 91a whose content at the time of a START signal from counter 81 has no significance. When a coincidence gate 110 determines that a pulse indicative of a discontinuity is in the first significant stage of register 91 and another pulse is in a dummy stage 91a, gate 110 will provide an input to a flip-flop 111 to set the flipflop 111 to an indication of two successive defects or a continuous defect over two increments in the X-direction. However, gate 110 will ignore a single defect pulse or non-coincidence. In this manner an indication of flaws of greater than one increment in the X or lateral scan direction are temporarily stored in flip-flop 111 and upon signal F from flip-flop 93, FIG. 17, a coincidence gate 112 will open transfer gates 113 and apply the information therein to flaw width memory 108. The system will now have further intelligence on the width in the lateral direction of any scan from any detected flaw. The signal J from flip-flop 111 will open transfer gates 114 and copy the web length measurement into memory 108. With the arrangement shown, there will be no recording of flaws of only one increment width in memory 108.

Figure 20:
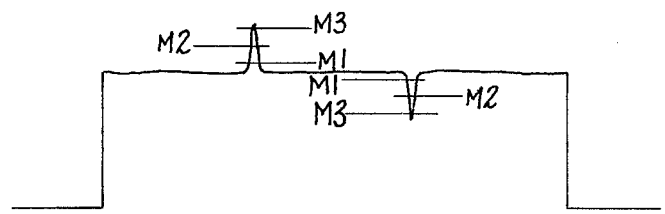
FIG. 20 is a diagram of a possible waveform output from the detector.

FIG. 19 exemplifies the threshold determining network 90 of FIG. 17. The threshold network 90 may comprise a plurality of threshold circuits 120–125 each of which may be in the form of a differential amplifier set to detect a pulse exceeding a predetermined height. Each amplifier has means shown in the form of potentiometers 127 and 128 for setting a threshold. The threshold circuits 120–125 may further include a one-shot multivibrator (not shown) to provide a shaped pulse output when one or more threshold levels is exceeded by a flaw pulse. For example, circuit 120 will detect a positive-going pulse of amplitude M1, circuit 121 will detect a positive-going pulse of amplitude greater than M2, circuit 122 will detect a positive-going pulse greater than amplitude M3, as exemplified in FIG. 20. The circuits 123, 124 and 125 will also detect the same magnitudes of negative-going pulses. The one-shot multivibrators are selected to have short firing time constants, and will repetitively fire to provide a plurality of defect pulses during a long continuous defect or discontinuity.

A pulse output from any of threshold circuits 120-125 is applied to shift register 91 as heretofore explained. The output of each is also applied to shift registers 130-135 in clock time, and upon retrace R are read into flaw category memory 109 through transfer gates 136a-136f if a discontinuity is present. Memory 109 is a six-plane binary memory which stores bits indicative of the levels M1, M2, M3, −M1, −M2 and −M3, in parallel bit stages in the planes 109a-109f.

The data in the memories 109a-109f is interpreted such that a M3 level pulse is indicated when a level one bit is present in planes 109a-109c; an M2 level pulse is indicated when a level one bit is present in planes 109b and 109c; and a M1 level pulse is indicated when a level one bit is present only in plane 109c; and similarly for the three lines of negative pulse levels.

The detectors provide a pulse output (if any) of predetermined width and height which is then applied to shift register 91 in timed relation with clock pulses C. A binary or logic level one pulse represents a detected discontinuity while a level zero indicates no detected discontinuity.

With the flaw position and size information stored as described, sufficient information is available to make various determinations of flaw density, number of flaws above or within given size ranges, and unflawed areas of the web.

All of the memories 99, 105, 108 and 109 may be contained within a computer or mini-computer 139 programmed to process for specific flaw information, and print out the location and size of the flaws, as well as the category thereof.

With the arrangement described, and with reference to FIG. 15, the flaw F1 will be detected during consecutive sweeps between the coordinates Y1, Y2 and Y2, Y3. This information will be stored in flaw length memory 105, as well as memory 99. Flaw F2 will be detected during successive sweeps between coordinates Y4, Y5, X14, X15 in a first scan, Y4, Y5, X13, X14; Y5, Y6, X14, X15; and Y5, Y6, X15, X16; in a succeeding scan, etc., and such detected flaws would be stored in both flaw width length memory 105, and flaw width memory 108.

The data processing equipment may be programmed to read out flaw information in various categories such as number of flaws, flaw size, flaw density per unit area, or other classifications. By correlating the information placed in memories 105 and 108 using adjacent flaw length counts as the common factor, the size of the defect, flaw or discontinuity may be determined, as well as the location thereof, and the fact that only one discontinuity is present in a given location, despite a plurality of flaw indicating pulses.

Figure 21:
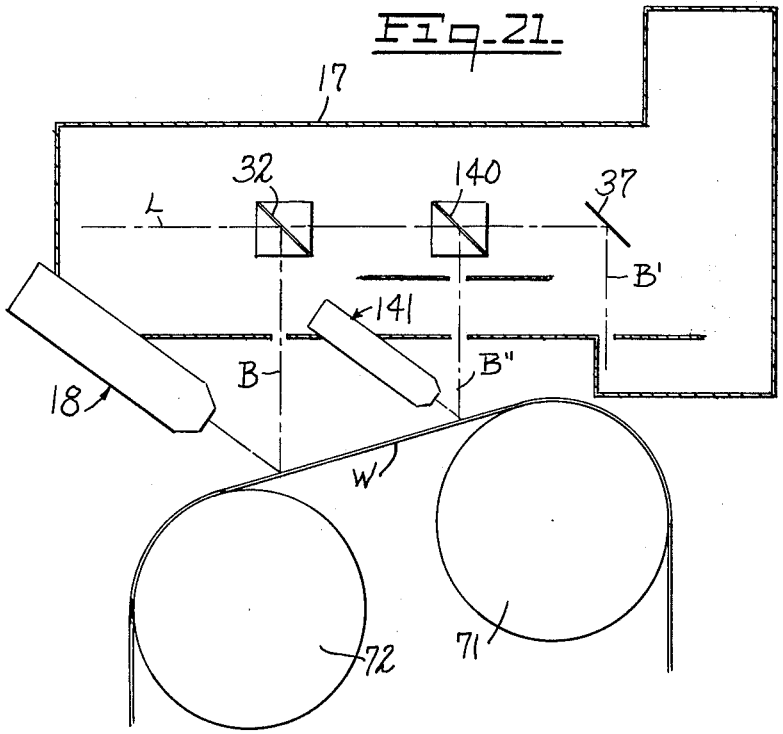
FIG. 21 is a diagram of an alternate optical system which will provide more than one inspection beam.

The invention is adaptable for two or more scanning beams. Such arrangement may be desirable where one beam spot is fairly large, and the possibility of very small harmful discontinuities exist. The very small discontinuities may not give sufficient change in reflectivity in a large beam spot. Therefore, a smaller scanned beam B'' is developed as shown in FIG. 21. An additional beam splitter 140 is disposed between beam splitter 32 and mirror 37, and an additional detector 141 is provided. A beam shaping or reshaping optical system may be disposed between beam splitters 32 and 140. The beam position information is developed as previously described, and function in parallel with two processing systems as shown in FIGS. 17-19.

The invention, as disclosed, is embodied in a system in which specular detection techniques are used. However, the invention is equally applicable to diffusion, retroreflection and transmission techniques. These different techniques primarily depend on the relative positioning of the detector with respect to the plane of the scanning beam.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. An optical inspection system comprising means providing a beam of light energy repetitively sweeping laterally across a length of web material, photodetector means responsive to changes in light on said web due to discontinuities therein and providing a pulse-like signal in response thereto, means responsive to the beam and movement of said beam across the web for generating a train of pulses where each pulse is representative of a succeeding incremental position of the beam on the web whereby the instantaneous position of the beam on the web is indicated by the number of pulses generated, a storage register, and means for applying said pulse-like signals to said storage register in synchronism with the pulses of said train during each sweep of said beam to record the lateral location of a discontinuity in the web.

2. The system of claim 1 further including means for measuring the length of the web passing said beam, and means for storing the lateral location and the length data of a discontinuity in the web.

3. The system of claim 1 wherein said storage register is a shift register, means connecting said train of pulses to said shift register to shift the output of said photodetector into said shift register.

4. The system of claim 1 further including means for detecting longitudinally adjacent discontinuities in successive sweeps.

5. The system of claim 1 further including means for detecting discontinuities occurring in the web during two or more successive pulses of said pulse train.

6. An optical inspection system comprising means for causing a beam of light to repetitively scan across a moving web, photodetector means positioned to be responsive to light on the web, means coupled to said photodetector means for detecting energy therefrom which departs a predetermined magnitude from a threshold level and is representative of a discontinuity in the web, means responsive to movement of the beam on the web for uniformly incrementally monitoring the position of the beam of light on the web as it scans across the web, means for measuring the length of material passing said beam, and means responsive to said monitoring means, said measuring means of said photodetector coupled means for locating the position of a discontinuity in the web.

7. The system of claim 6 wherein said means for monitoring comprises means for generating a train of pulses, each pulse indicative of an incremental distance of movement of said beam across said web, and said means for locating comprises a storage device responsive to said photodetector pulses for storing the location of detection of a discontinuity in the web as a function of number of occurred pulses of said pulse train during each scan of the web.

8. An optical inspection system comprising means providing a first beam of light adapted to repetitively move through a predetermined angle, beam position monitoring means; means for splitting the first beam into second and third beams, directing the second beam toward a surface to be inspected, and directing the third beam toward said monitoring means so that said third beam moves in timed and spatial relation with said second beam, said beam position monitoring means positioned to receive said third beam and provide pulses of light in timed relation with incremental movement of said second beam, and means for counting said pulses to monitor the position of said second beam on said surface to be inspected.

9. The system of claim 8 wherein said monitoring means comprises a plurality of light conducting rods, one ends of said rods being linearly aligned and uniformly spaced apart.

10. The system of claim 9 further including a photodetector positioned to be responsive to light transmitted to the other end of said rods, and effective to provide a pulse-like signal in response to light energy transmitted by each rod.

11. The system of claim 9 wherein said one ends are positioned the same distance from said means for splitting as the surface to be inspected.

12. The system of claim 11 wherein said one ends are aligned along a path having a dimension substantially equal to the effective linear dimension of sweep of said second beam across said surface.

13. An optical inspection system comprising means providing a beam of light energy repetitively sweeping across a length of web material at essentially linear velocity on said web material, photodetector means responsive to changes in light on said web due to discontinuities therein and providing a pulse-like signal in response thereto, means responsive to the beam and movement of said beam for generating a train of pulses in time and spatial relation with the sweep of the beam where each pulse is representative of a succeeding position of the beam on the web whereby the position of the beam on the web is continuously monitored during each sweep.

14. The system of claim 13 wherein said storage register is a shift register, means applying said pulse train to said shift register to shift the output of said photodetector therein.

15. The system of claim 14 including further storage means and means for transferring the content of said shift register to said further storage means at the end of a sweep.

16. The system of claim 15 further including means for enabling said transfer means only when a discontinuity is detected during a sweep.

17. The system of claim 13 further including means for longitudinally moving said web as said beam sweeps laterally thereacross, means for measuring the length of said web as it passes said beam, and means responsive to detection of a discontinuity for recording the measured length of said web.

18. The system of claim 17 further including means for storing the lateral position and measured length of each detected discontinuity.

19. In an optical inspection system comprising a light source and an optical system for directing a beam of light from said source toward an object to be inspected and means for causing said beam to scan across the object; said optical system including first and second plano-convex cylindrical lenses disposed behind a diverging lens on an optical axes, said first and second cylindrical lens having surfaces defined from axes which are disposed transverse to each other.

20. The system of claim 19 wherein the axes of said cylindrical lenses are essentially perpendicular.

21. In an optical inspection system comprising means providing a beam of light, a pivotally mounted mirror having a plane surface positioned to receive said beam and reflect it through a predetermined angle so that the spot of the reflected beam scans across the plane of a web to be inspected; the improvement comprising a diverging lens means mounted between said mirror and said plane and transmitting the reflected beam therethrough, said lens means being positioned and having surfaces so contoured with respect to said mirror and the plane of the web that the spot of the reflected beam on the web plane moves thereacross at essentially constant velocity during a scan thereof across the web, said lens surfaces being symmetrical with respect to the optical axis thereof.

22. The system of claim 21 wherein said lens is a concave-plano lens with the plano surface facing the web.

23. The system of claim 21 wherein the focal length of said lens is so selected that the spot of the beam on the web is essentially the same shape throughout a scan of the spot across the web.

24. An optical inspection system comprising means providing a beam of light adapted to move across a surface, a first beam splitter for directing the beam toward the surface and providing a second beam moving in timed relation with said first beam, a second beam splitter for directing the second beam toward the surface and providing a third beam so that the third beam moves in timed relation with the first and second beams, means positioned to receive said third beam and provide pulses of light in timed relation with incremental movement of said first and second beams and means for counting said pulses to monitor the position of said first and second beams.

25. An optical inspection system for detecting discontinuities in web material, comprising means providing a beam of light sweeping repetitively through a predetermined angle, a plurality of light transmitting optical rods having one ends thereof in alignment and uniformly spaced apart; means for splitting said beam into second and third beams, directing said second beam toward the plane of the web material a predetermined distance from said splitting and directing said third beam toward said aligned one ends essentially the same predetermined distance away; first detector means positioned to be responsive to said second beam and emit a pulse-like signal in response to a predetermined change in light of said second beam reflected from the web; second detector means positioned at the other ends of said rods and effective to emit a train of pulses in response to said third beam being incident on said one ends of said rods; a storage register; and means for applying said train of pulses to said storage register during a sweep of said second beam across the web to record the lateral position of any discontinuities on the web.

26. The system of claim 25 further including lens means for producing essentially linear velocity of said second and third means on the web and said one ends.

* * * * *

UNITED STATES PATENT AND TRADEMARK OFFICE
CERTIFICATE OF CORRECTION

PATENT NO. : 3,917,414
DATED : November 4, 1975
INVENTOR(S) : James D. Geis - Henry R. Cofek It is certified that error appears in the above-identified patent and that said Letters Patent are hereby corrected as shown below:

Column 1, line 10, "surfaces" should read --surface--.
Column 1, line 53, "scannng" should read --scanning--.
Column 3, line 2, "adjafent" should read --adjacent--.
Column 13, line 5, "of" should read --and--.

Signed and Sealed this tenth Day of February 1976

[SEAL]

Attest:

RUTH C. MASON
*Attesting Officer*

C. MARSHALL DANN
*Commissioner of Patents and Trademarks*